United States Patent [19]
Hartmann

[11] Patent Number: 5,409,679
[45] Date of Patent: Apr. 25, 1995

[54] PROCESS FOR THE PRODUCTION OF TITANIUM DIOXIDE

[75] Inventor: Achim Hartmann, Pulheim, Germany

[73] Assignee: Kronos, Inc., Hightstown, N.J.

[21] Appl. No.: 548,017

[22] Filed: Jul. 5, 1990

Related U.S. Application Data

[63] Continuation of Ser. No. 285,432, Dec. 16, 1988, abandoned.

[30] Foreign Application Priority Data

Dec. 17, 1987 [DE] Germany ............... 37 42 838.1

[51] Int. Cl.⁶ ............... C01G 23/02; C01G 23/04; C01B 17/00; C01B 17/69
[52] U.S. Cl. ............... 423/82; 423/242.1; 423/522; 423/610; 423/615; 423/616; 423/530; 423/83; 423/DIG. 2
[58] Field of Search ............... 423/82, 242 R, 522, 423/530, 531, 610, 615, DIG. 2, 616, 83, 242.1

[56] References Cited

U.S. PATENT DOCUMENTS

| | | | |
|---|---|---|---|
| 2,055,082 | 9/1936 | Keyes | 423/530 |
| 2,098,056 | 2/1937 | McBerty | 423/530 |
| 3,086,846 | 4/1963 | Clark | 423/530 |
| 3,387,927 | 6/1968 | Goldberger | 423/531 |
| 4,013,755 | 3/1977 | Weiler et al. | 423/615 |
| 4,070,441 | 1/1978 | Pessel | 423/522 |
| 4,153,628 | 5/1979 | Gerken et al. | 423/DIG. 2 |
| 4,288,418 | 9/1981 | Davis et al. | 423/82 |
| 4,902,485 | 2/1990 | Bayer et al. | 423/82 |

Primary Examiner—Steven Bos
Attorney, Agent, or Firm—Michael J. Cronin

[57] ABSTRACT

The production of titanium dioxide by the sulphate process generates waste substances such as the wash filtrates, which are formed in the washing of titanium dioxide hydrate, and waste gases which contain sulphur dioxide. In this improved process the wash filtrate is used to remove the sulphur dioxide from the waste gas while the sulphuric acid content of the wash filtrate is raised and the sulphuric acid-containing process solution thus obtained is used within the scope of the titanium dioxide production process. The waste gas and the wash filtrate are passed countercurrently through a series of several washing steps and are contacted with each other by introducing the wash liquid into the waste gas in a finely divided form in scrub towers. The sulphuric acid content of the washing fluid is stepwise changed from washing stage to washing stage. The sulphur dioxide content of the waste gas is reduced to values that may be discharged into the ambient atmosphere. The sulphuric acid-containing process solution is returned to the digestion tank and/or used for dissolving the digestion cake.

18 Claims, 1 Drawing Sheet

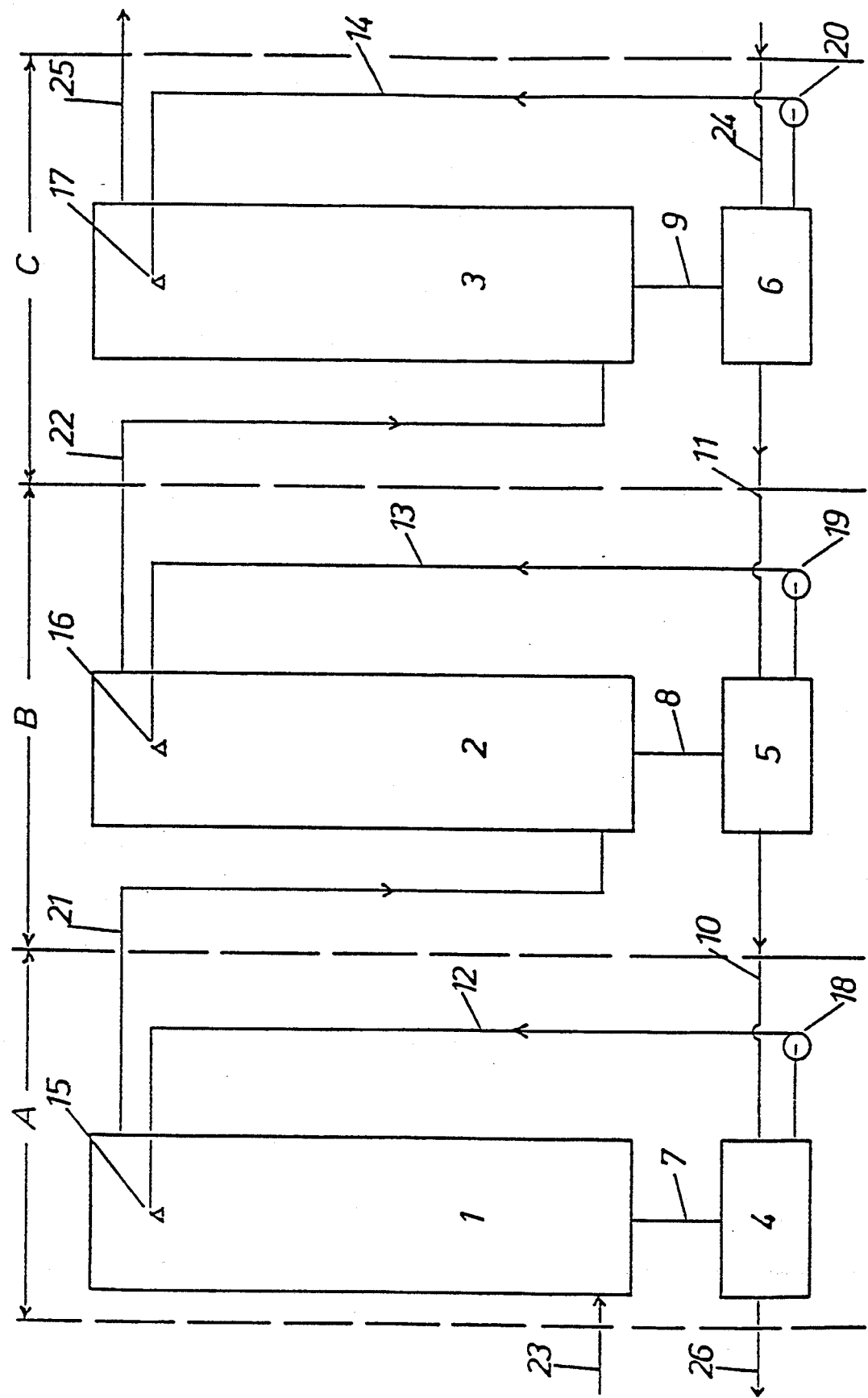

PROCESS FOR THE PRODUCTION OF TITANIUM DIOXIDE

RELATED APPLICATION

This application is a Continuation of Ser. No. 07/285,432, filed Dec. 16, 1988, now abandoned.

This invention relates to a process for the production of titanium dioxide by precipitating titanium dioxide hydrate by thermal hydrolysis from a titanyl sulphate solution. The latter is obtained after the digestion of titaniferous and ferriferous materials in sulphuric acid, separating the precipitated titanium dioxide hydrate from the hydrolysis mother liquor through filtration, washing the separated titanium dioxide hydrate thereby generating wash filtrate, and calcining the washed titanium dioxide hydrate.

In such a process, known as the "sulphate process", waste gases and waste waters are generated at various points in the process whose disposal, on the one hand, has become problematic due to ever tightening pollution control requirements and, on the other hand, leads to a loss of valuable materials. Said waste gases comprise, for example, the waste gases generated during the digestion of the titaniferous materials as well as the waste gases formed during the calcination of titanium dioxide hydrate. These waste gases contain—besides finely distributed solids such as ore dust or titanium dioxide dust, sulphur trioxide and sulphuric acid—also water steam, carbon dioxide, oxygen and sulphur dioxide. However, sulphur oxide-containing waste gases may also be developed at other points in the sulphate process and in other titanium dioxide production processes, for instance in processes in which the titanium dioxide is made by producing titanium tetrachloride and reacting the titanium tetrachloride with oxygenous gases, which latter process is called the "chloride process". Whereas solids, sulphur trioxide and sulphuric acid can readily be separated from the waste gases, their sulphur dioxide content causes problems.

For reasons of environmental protection, the sulphur dioxide content in waste gas has to be minimized as far as possible before the gas can be discharged into the atmosphere. So far, sulphur compounds have often been removed by scrubbing the waste gas with water. Although this method readily removes sulphur trioxide and sulphuric acid, the removal of sulphur dioxide has often been insufficient.

In the washing of titanium dioxide hydrate separated from the hydrolysis mother liquor by filtration, solutions are generated which have a low content of sulphuric acid and contain small quantities of metal sulphates not precipitated in the hydrolysis step, especially ferrous sulphate. These solutions are called "wash filtrate" in the following text.

As a rule this wash filtrate used to be discharged into the sewer. Until recently, this discharge was unobjectionable because of the low contents of said substances in the wash filtrate. However, tightening pollution control requirements now forbid this disposal. Moreover, valuable materials, particularly sulphuric acid, were lost through this disposal of the wash filtrate. Although said materials are present in the wash filtrate at low concentrations, their quantity is not negligible because of the large industrial scale at which the sulphate process is run.

The objective therefore was somehow to return the wash filtrate to the process. An attempt was made to use the wash filtrate directly in digestion, e.g. as set-off water, or in dissolving the solid digestion cake formed in many digestion processes; but this addition of the wash filtrate involved the risk—especially when added in larger quantities—of adversely affecting the digestion and/or the digestion cake solution. In particular, when the wash filtrate was used for dissolving the digestion cake, this involved the risk of undesirable nuclei formation or of premature hydrolysis of the titanyl sulphate. This risk could only be countered by using a solution with a sulphuric acid concentration of several weight percent, preferably not below 8 wt %.

Now therefore, the objective of the instant invention was to find a process which firstly reliably reduces the sulphur dioxide content of the waste gases to an extent that the cleaned waste gas can safely be discharged into the atmosphere and which secondly permits use of the sulphur dioxide content of the waste gases for the titanium dioxide production and to reuse in the sulphate process as much as possible of the wash filtrate derived from the separation of the titanium dioxide hydrate from the mother liquor, by exploiting its sulphuric acid content.

A process is known from Czechoslovakian application CS-B-220 670, filed on May 4, 1981, published on Sep. 15, 1982, in which sulphur oxides are scrubbed from industrial waste gases by utilizing waste sulphuric acid from the titanium dioxide industry. The wash solutions used in the cited process contain 10 to 30 wt % $H_2SO_4$, 1 to 13 wt % ferrous sulphate and possibly up to 2 wt % titanyl sulphate. They thus correspond to a hydrolysis mother liquor but not to wash liquids derived from the washing of the titanium dioxide hydrate. In the cited process washing takes place in a countercurrent manner in only a single stage under adiabatic conditions at an elevated temperature of 75 degrees C. to 190 degrees C., the wash solution being partially concentrated by utilizing the heat content of the gas. The efficiency of sulphur dioxide separation is insufficient. Owing to the high solids content of the wash solution, deposits can readily form in the wash device.

The process of the cited reference does not provide for use of the wash filtrate obtained in separating titanium dioxide hydrate from the mother liquor nor would such use be feasible.

Other publications are known that deal with the absorption of sulphur oxides through ferriferous waste waters from pigment manufacture.

In one of the publications [KHIMICHESKAYA PROMYSHLENNOST' (The Soviet Chemical Industry), volume 1983 (9), Moscow, G. L. ZVYAGINTSEV et. al. "Industrial Tests of a Process of Trapping Sulfur Dioxide with Iron Vitriol Solutions:, pages 543 to 546 (Chemical Abstracts Volume 99, reference No. 199308s, published in December 1983)] waste gases are washed with solutions of ferrous sulphate heptahydrate or of ferrous sulphate monohydrate separated from hydrolysis mother liquor during concentration of the liquor. The first-mentioned solutions contain 1.5 to 3 wt % iron, the latter solutions contain 2 wt % iron. These solutions are not sufficiently effective and the used solutions are not returned to the sulphate process but are used elsewhere.

According to this publication, the sulphur dioxide absorption can admittedly be increased; this however requires not only the addition of iron sulphate solution but also the simultaneous addition of a substance with an alkaline reaction. Such an addition of an additional substance however involves increased costs.

Moreover, the addition of the alkaline-reacting substance leads to the formation of products which cannot readily be used further and therefore have to be removed at high costs or dumped. This in turn burdens again the environment.

In a further publication [KHIMICHESKAYA PROMYSHLENNOST' (The Soviet chemical Industry), volume 1984 (9), Moscow, G. L. ZVYAGINTSEV "Industrial Tests of the Process of Absorption of Sulfur Oxides by Iron-Containing Wastewater", pages 546 to 547 (Chemical Abstracts Volume 102, reference No. 11613c, published in January 1985)] sulphur dioxide is washed from waste gas by means of waste waters derived from a plant for the production of iron oxide pigments which are made from the iron sulphates derived from titanium dioxide manufacture. These waste waters contain—besides solid iron oxide—between 0.04 and 0.3 wt % dissolved iron, the iron being present essentially in its trivalent form. An expensive washing system with several different apparatuses is used and the efficiency of sulphur dioxide removal is unsatisfactory in this process run on an industrial scale. The wash liquid is separately fed into the individual wash devices; a reuse of the used wash liquid is not provided for and the saving of wash water is only 20%. The process is dependent on the operation of an iron oxide pigment production plant in association with a titanium dioxide production plant.

The wash liquids used in the cited reference also differ essentially from the wash filtrates derived from titanium dioxide hydrate separation. It is not possible to use the process of the cited reference for solution of the problem from which the instant application starts.

The objective of the instant invention is to reduce environmental pollution and to make beneficial use of the sulphur compounds contained in the waste gases.

This objective has been reached by finding a new process for the production of titanium dioxide by precipitating titanium dioxide hydrate by thermal hydrolysis from a titanyl sulphate solution that is obtained after the digestion of titaniferous and ferriferous materials in sulphuric acid, separating the precipitated titanium dioxide hydrate from the hydrolysis mother liquor through filtration, washing the separated titanium dioxide hydrate, thereby generating wash filtrate, and calcining the washed titanium dioxide hydrate.

The process of this invention, as claimed herein, comprises:
  a) treating a waste gas which contains sulphur dioxide and at least 8 percent by volume oxygen—related to the dry gas after the deduction of the moisture content—with the wash filtrate forming a wash liquid which contains small amounts of sulphuric acid and iron sulphates, the major part of the sulphur dioxide contained in the waste gas being absorbed by the wash filtrate and transformed into sulphuric acid whereby the sulphuric acid concentration of the wash filtrate is raised and a sulphuric acid-containing process solution is obtained;
  b) utilizing this sulphuric acid-containing process solution within the scope of the titanium dioxide production process; and
  c) the waste gas treatment with wash liquid taking place in a series of at least two consecutive washing stages in such a way as to
  c1) introduce the untreated waste gas into the first washing stage and the fresh wash filtrate derived from the titanium dioxide hydrate washing, into the last washing stage,
  c2) pass the waste gas successively through the various washing stages and treat it in these washing stages with the wash liquid formed from the wash filtrate whose sulphuric acid content stepwise decreases from the first through to the last washing stage (seen in the direction of waste gas flow), the treatment being carried through in such a way that in each washing stage the wash liquid is introduced into the waste gas in a finely divided form in a scrub tower, and
  c3) withdraw the cleaned waste gas from the last washing stage and the sulphuric acid-containing process solution obtained from the wash filtrate, from the first washing stage.

In this process, it is especially beneficial to introduce into each washing stage (except the last washing stage) wash liquid from the immediately following washing stage (in the waste gas flow direction).

A wash filtrate is preferred which contains from 0.2 to 4 wt % $H_2SO_4$ and from 0.2 to 1 wt % iron in the form of iron sulphates and whose sulphuric acid content is increased to from 8 to 13 wt % in the course of the waste gas treatment.

Moreover, it is preferably to maintain a ratio of trivalent iron to total iron of more than 0.05 in the wash liquid in the course of the waste gas treatment and to adjust a ratio of sulphuric acid concentration to total iron concentration of at least 1 in the wash filtrate prior to contacting it with waste gas, this latter ratio in the wash liquid formed from the wash filtrate being raised to above 20 in the course of the waste gas treatment.

In a preferred embodiment of the process of the instant invention the waste gas is treated in three washing stages.

Generally, a specific range for the concentration of sulphuric acid is adjusted in the wash liquid in each washing stage.

In a favourable embodiment of the invention the sulphuric acid concentration in the wash liquid can be adjusted by recycling at least part of the wash liquid within a washing stage between the scrub tower and a storage vessel of said washing stage.

In another embodiment of the invention fresh wash filtrate is not only introduced into the last washing stage (in waste gas flow direction) but also into one or more of the other washing stages.

In still another embodiment of the invention wash liquid is introduced into one or more of the washing stages from one and/or more of those washing stages which do not immediately follow the washing stage into which the wash liquid is introduced (in waste gas flow direction).

In a further embodiment of the invention wash liquid is introduced into one or more of the washing stages from one and/or more of those washing stages which precede the washing stage into which the wash liquid is introduced (in waste gas flow direction).

All process methods may be combined with each other.

A favourable embodiment of the invention is characterized in that the waste gas treatment in three washing stages is carried out in such a way that a sulphuric acid concentration of from 8 to 12 wt % is adjusted in the wash liquid of the first washing stage (in the waste gas flow direction), a sulphuric acid concentration of from 3 to 7 wt % in the wash liquid of the second washing stage and a sulphuric acid concentration of from 0.2 to 4 wt % in the wash liquid of the third washing stage.

The sulphuric acid-containing process solution obtained from the wash filtrate in treating the waste gas can be returned to various points of the titanium dioxide manufacturing process.

In a preferred embodiment of the invention the sulphuric acid-containing process solution is returned to the digestion tank.

Another favourable embodiment of the invention is characterized in that a solid digestion cake is formed in the digestion of titaniferous and ferriferous materials which cake is dissolved forming titanyl sulphate solution, the sulphuric acid-containing process solution being used for dissolving the digestion cake.

The sulphuric acid-containing process solution can also be added in various portions simultaneously at different points of the titanium dioxide manufacturing process.

In the process of the invention the most varied sulphur dioxide-containing waste gases can be used provided they contain at least 8 vol. % oxygen related to dry gas after deduction of the moisture content. A preferred embodiment is characterized in that the waste gas used is derived from titanium dioxide manufacturing processes such as the chloride process and the sulphate process. In this context, a favourable embodiment is characterized in that the waste gas used is the calciner exhaust gas generated in the calcination of the washed titanium dioxide hydrate.

These process methods have the advantage of profitably utilizing two waste materials of the $TiO_2$ production process at a time which without such methods have considerably burdened the environment or involved high expenditures for the removal of the pollutants, namely the sulphur dioxide contained in the waste gases and the wash filtrate derived from titanium dioxide hydrate separation. In the process of the present invention, these waste materials are kept away from the environment and are profitably used within the scope of the sulphate process. The sulphur dioxide can be removed from the waste gas at a very high yield and with high reliability by means of a device of simple design. The sulphuric acid-containing process solution obtained in washing the waste gas can be utilized to good effect within the scope of the sulphate process. Due to the elevated sulphuric acid concentration of this process solution, its use in digesting the titaniferous material or possibly in dissolving the digestion cake does not involve any difficulties as would be incurred in directly using the wash filtrate owing to the formation of undesirable nuclei or a premature hydrolysis of the titanyl sulphate. Moreover, the utilization of the sulphur dioxide contained in the waste gas economizes on fresh sulphuric acid in the sulphate process.

With the process of the instant invention it is possible to remove up to 94% of the sulphur dioxide contained in the waste gas whose sulphur dioxide concentration may range up to about 4000 mg/m$^3$ (gas in standard condition after deduction of the moisture content) and thereby raise the sulphuric acid concentration in the wash filtrate to such an extent that the wash filtrate can readily be used in the sulphate process. The cleaned waste gas has a sulphur dioxide content of at most about 400 mg/m$^3$ (gas in standard condition after deduction of the moisture content), thus complying with the legal requirements. In many cases the sulphur dioxide content of the cleaned waste gas is even below the above value.

Prior to this invention, it had not been known that the wash filtrates with their low concentrations of sulphuric acid and iron sulphate could be beneficiated as to their sulphuric acid content to such a level in a simple process that the resulting sulphuric acid-containing process solution can readily be used in the sulphate process. Generally, the sulphuric acid concentration of the wash filtrate ranges only from 0.2 to 4 wt % $H_2SO_4$ and its iron sulphate content is not more than about 1 wt %—preferably from 0.2 to 0.3 wt %—calculated as Fe. Surprisingly, it was found in developing the present invention that it is possible in a simple, uncomplicated process to raise the low sulphuric acid concentration of the wash filtrate without difficulty up to more than about 10 wt % $H_2SO_4$. It was further found that the iron content of the wash filtrate, despite its low level, is of decisive importance for the execution of the process of the invention.

A process is disclosed in DE-A-22 15 177, a patent application filed on Mar. 28, 1972 and published on Oct. 12, 1972, in which sulphur dioxide-containing waste gases can largely be freed from sulphur dioxide by washing with a sulphuric acid solution under the catalytic action of ferric ions, but this process uses a higher initial concentration of the sulphuric acid of from 5 to 40 wt % $H_2SO_4$.

The essential point in the process of the present invention is a specific controlling of the procedure in which several steps have to be precisely adjusted to each other.

The present invention in which the waste gas and the wash filtrate are brought together in a countercurrent manner takes advantage of the fact that the oxidation of the sulphur dioxide in the wash liquid is influenced by the sulphuric acid concentration of the latter and that, in the provided range of sulphuric acid concentration, the efficiency of the sulphur dioxide oxidation and hence the removal of sulphur dioxide from the waste gas decreases with increasing sulphuric acid concentration of the wash liquid.

Due to the countercurrent procedure, the fresh waste gas with high sulphur dioxide content is contacted with a wash liquid with relatively high sulphuric acid concentration. The lower the sulphur dioxide content of the gaseous phase in the course of the washing stages, the lower is the sulphuric acid concentration of the wash liquid contacted with the gaseous phase and the more efficient therefore is this wash liquid. This procedure is only practicable if the washing is carried out in at least two successive washing stages, the sulphuric acid concentration of the wash liquid moreover stepwise decreasing from the first through to the last washing stage. The upper number of washing stages is only limited by the costs rising with increasing number of these washing stages. It is often possible to achieve a very good efficiency in sulphur dioxide removal with only three washing stages.

In order to achieve an efficient treatment of the waste gas, it is also necessary that the dispersion of the liquid phase in the gaseous phase is as fine as possible. It was found that it is often suitable to simply atomize the wash liquid in the empty interior—without built-in devices—of the scrub tower provided for each washing stage. The wash liquid is preferably sprayed from the top downward into the gas stream that is introduced from the bottom into the vertical scrub tower. Part of the nozzles, however, may also be directed upward. The number of nozzles required and the scope of wash liquid distribution required can be determined by simple trials.

In a suitable embodiment of the process of the present invention, a packing is installed in the scrub tower, all the wash liquid is fed onto the packing and distributed in the packing, and the waste gas is fed into the packing from below. Within the packing, the waste gas comes into contact with the finely divided wash liquid.

Furthermore, it was found that a certain concentration of trivalent iron in the wash liquid is of importance for the process of the invention to be successful. Further investigations showed that there is virtually no oxidation of sulphur dioxide at all if no trivalent iron is present, but that sulphur dioxide oxidation gets going precipitously if the ratio of trivalent iron to total iron in the wash liquid exceeds the value of 0.05. This ratio may be raised up to a value of 1 (then all iron in the wash liquid is present in trivalent form). But this ratio should not be raised more than absolutely necessary because it is desirable for economical reasons (saving of reducing agent) to have as little trivalent iron as possible in the process solution returned to the sulphate process. For example, a ratio of trivalent to total iron in the wash liquid of from about 0.5 to about 0.85 is desirable.

It was further found that the reduction of the efficiency of sulphur dioxide oxidation as a result of rising sulphuric acid concentration in the wash liquid can be offset by a rising concentration of trivalent iron in the wash liquid. Therefore, the ratio of the concentration of sulphuric acid to trivalent iron in the wash liquid can be considered as a factor that influences the sulphur dioxide conversion. The concentration ratio of sulphuric acid to trivalent iron in the wash liquid should preferably range from about 20 to about 70. The required trivalent iron concentration can be adjusted in the wash filtrate prior to using it by adding a suitable oxidant or by some other suitable method, or it may adjust itself in the wash filtrate at the beginning of the washing.

In an embodiment of the present invention air is introduced into the wash liquid in storage vessels arranged below the scrub towers.

It has generally been found to be especially favourable to adjust a ratio of sulphuric acid concentration to total iron concentration of at least about 1 in the wash filtrate before contacting it with the waste gas. It is advisable to raise this ratio to above about 20 in the course of the waste gas treatment in the wash liquid.

Further factors that influence the execution of the process of the present invention are the time of contact between wash liquid and waste gas as well as the temperatures of wash liquid and waste gas. The temperature of the gaseous phase should preferably be equal to or higher than the temperature of the liquid phase contacting it. In any case, the temperature must not be below the dew point for water steam in the gaseous phase, otherwise water will be condensed from the waste gas which often contains considerable quantities of water steam and the sulphuric acid concentration in the wash liquid will then undesirably drop. With regard to the temperature of the waste gas, it has to be ensured that the cleaned waste gas when leaving the last washing stage will have a sufficiently high temperature to be discharged through the stack without any additional aids. The sulphur dioxide conversion efficiency increases with decreasing temperature of the wash liquid. The optimum temperature for this purpose usually is around 40 degrees C. The necessary contact times and temperatures can easily be determined by trials. The necessary contact time affects not only the sulphuric acid concentration to be reached in the process solution that is obtained from the wash filtrate in treating the waste gas and that is to be used in the titanium dioxide production process, but affects also the number of washing stages to be employed.

As the volume of waste gas to be treated is rather great, the treatment is carried through at pressure conditions to obtain the clean waste gas at a pressure that is as little as possible above normal pressure.

Within the individual washing stages, the required concentrations and, if necessary, the temperatures of the wash liquid can be adjusted for instance by recycling the wash liquid between its scrub tower and a storage vessel in which the wash liquid, if necessary, can be appropriately treated, e.g. cooled or heated, and/or by introducing fresh wash filtrate and/or wash liquid from one and/or more of not immediately following washing stages (in the waste gas flow direction). However, appropriate conditions can also adjust themselves in the wash liquid in one or more washing stages, which is the case preferably in the middle washing stages. If desired, part of the wash liquid may be fed from one or more washing stages via one or more washing stages neighbouring them into one or more other washing stages, said part of wash liquid not being contacted with the waste gas in the washing stages that lie between.

Before treating the waste gas as specified in the present invention, it can be freed from solids particles, sulphur trioxide and sulphuric acid; known processes can be used for this purpose.

The waste gas withdrawn from the last washing stage usually is so clean that it can directly be released into the atmosphere via the stack.

It is possible to follow the usual methods for digesting the titaniferous and ferriferous materials, dissolving the resulting digestion cake if any, precipitating the titanium dioxide hydrate from the titanyl sulphate solution and separating and washing the titanium dioxide hydrate and calcining it. It is likewise possible to treat the digestion solution in the usual way prior to hydrolysis, e.g. by precipitating and separating ferrous sulphate heptahydrate, by clarifying, concentrating and finally filtering it. The titanium dioxide hydrate can be filtered by any optional method, e.g. by means of a rotary filter or a vacuum-operated leaf filter (Moore filter). The titaniferous and ferriferous materials may consist of all the usual materials, such as ilmenites, beneficiated ilmenites, titaniferous slags or concentrates in which the titanium dioxide concentration has been increased by separating part of the iron from the ore.

In the FIGURE, a suitable embodiment of the process of the invention is explained by a flow chart, without the invention being restricted to the pattern shown in the flow chart.

BRIEF DESCRIPTION OF THE DRAWING

The FIGURE is a flow diagram of an illustrative embodiment of the invention

The FIGURE shows three washing stages A, B and C. Each washing stage comprises a scrub tower viz. washing stage A comprises scrub tower 1, washing stage B scrub tower 2 and washing stage C scrub tower 3.

Below the scrub towers 1, 2 and 3 there are the storage vessels 4, 5 and 6 connected with their respective scrub towers by lines 7, 8 and 9. The storage vessels 4, 5 and 6 are also connected with each other by lines 10 and 11. Furthermore, lines 12, 13 and 14 for wash liquid start from the storage vessels 4, 5 and 6 and end in fluid distributors 15, 16 and 17 in the upper ends of the scrub towers. If required, in the case of empty scrub towers, further fluid distributors may be installed in each scrub tower below fluid distributors 15, 16 and 17 and supplied by branching the lines 12, 13 and 14. The wash liquid is pumped by pumps 18, 19 and 20 into lines 12, 13 and 14. Lines 21 and 22 which come off the scrub towers 1 and 2, convey the treated waste gas into the bottom part of the subsequent scrub towers. Line 23 for waste gas to be cleaned leads into the bottom part of scrub tower 1. Line 24 for the wash filtrate coming from the titanium dioxide hydrate filtration plant leads into storage vessel 6. Line 25 at the upper end of scrub tower 3 serves to remove the cleaned waste gas; line 26 starting from storage vessel 4 draws off the sulphuric acid-containing process solution derived from the wash filtrate in treating the waste gas. Valves may be installed in the lines (not shown in the graph) to control the liquid flow.

The above described facility may be made of the usual materials. The scrub towers and storage vessels are preferably made of plastic materials such as polyester, polypropylene or polyethylene or of rubber-lined steel. The mentioned plastic materials are also preferred for the packing.

The waste gas—after having been freed, if necessary, from solids particles, sulphuric acid and sulphur trioxide in a pre-washing stage—is passed through line 23 into scrub tower 1 of washing stage A. From there, the waste gas passes through line 21 into scrub tower 2 of washing stage B and then through line 22 into scrub tower 3 of the washing stage C. In each of the scrub towers part of the sulphur dioxide contained in the waste gas is scrubbed out. The cleaned waste gas is eventually withdrawn from scrub tower 3 of washing stage C through line 25 and passed to the stack, if necessary after a post-cleaning stage to remove the entrained liquid droplets.

The wash filtrate derived from the titanium dioxide hydrate filtration plant is fed through line 24 into storage vessel 6 of washing stage C. From there it is passed by pump 20 through line 14 into scrub tower 3 and distributed by a fluid distributor 17. After scrubbing, the wash liquid is collected at the bottom of scrub tower 3 and passed through line 9 into the storage vessel 6 and from there through line 11 into storage vessel 5 of washing stage B. From vessel 5, the wash liquid is pumped by pump 19 through line 13 into scrub tower 2 ad distributed by the fluid distributor 16. Then the wash liquid is collected at the bottom of scrub tower 2 and passed through line 8 into storage vessel 5. From there the wash liquid passes through line 10 into storage vessel 4 of washing stage A from where it is pumped by pump 18 through line 12 into scrub tower 1 and distributed by the fluid distributor 15. The wash liquid is then transferred through line 7 into storage vessel 4 which it leaves as sulphuric acid-containing process solution through line 26 to be returned into the digestion tank and/or, if desired, into the digestion cake dissolving vessel.

In principle, the entire quantity of the wash filtrate can be fed into the scrub towers in all washing stages to be contacted there with the waste gas. But it is also possible, if desired, not to feed the entire quantity of the wash filtrate into all scrub towers for distributing it but to pass part of the wash liquid through lines directly from one or more of the storage vessels into one or more of the other storage vessels. Moreover, it is possible to recycle a certain portion of the wash liquid between the scrub tower and the storage vessel of a washing stage.

These two measures permit adjustment of the sulphuric acid concentration of the wash liquid in the storage vessels and thus in the respective towers of a washing stage.

The invention is illustrated by, but not limited by, the following examples.

EXAMPLE 1

In a pretreatment stage, calciner exhaust gas was freed from titanium dioxide dust, sulphuric acid and sulphur trioxide. The exhaust gas with a sulphur dioxide content of 4000 mg/m$^3$ (gas of standard condition after deduction of the moisture content) and an oxygen content of 12 vol. % (related to dry gas after deduction of the moisture content) at a temperature of 70 degrees C. was passed at a rate of 3000 m$^3$/h (gas of standard condition after deduction of the moisture content) to a plant consisting of three washing stages A, B and C, as shown in the flow chart of the FIGURE. Each of the three scrub towers 1, 2 and 3 are in this example empty and of glass-reinforced polyester and had a square inner cross section with a side length of 700 mm and an internal height of 9 m. Each scrub tower was equipped with six groups of nozzles installed in distances of 1.4 m one above the other. Each group of nozzles consisted of two full-conical nozzles. The nozzles of each scrub tower were fed with 6 m$^3$/h wash liquid at a temperature of 70 degrees C. The wash filtrate used for scrubbing the calciner exhaust gas was derived from the titanium dioxide hydrate separation from the mother liquor; said wash filtrate contained 2 wt % sulphuric acid and 0.3 wt % iron, 47% of which was present as trivalent iron. The wash filtrate was used at a rate of 198.2 kg/h.

The wash filtrate was fed through line 24 into storage vessel 6 of washing stage C. From this vessel the wash filtrate was first recycled via line 14, nozzles 17 and line 9 until the wash liquid in washing stage C had reached a sulphuric acid concentration of 4 wt %. After this start-up phase, corresponding start-up phases followed in the two other washing stages until a steady state was reached there, too. A sulphuric acid concentration of 6.1 wt % was thus adjusted in scrub tower 2 and storage vessel 5 of washing stage B, and a concentration of 9.9 wt % $H_2SO_4$ was adjusted in scrub tower 1 and storage vessel 4 of washing stage A. The iron content in storage vessel 6 of washing stage C amounted to 0.29 wt %. 50% of this iron was present in trivalent form. In storage vessel 5 of washing stage B the iron content was 0.285 wt %, 59% being present in trivalent form; 0.28 wt % iron with 67% in trivalent form were present in storage vessel 4 of washing stage A. The cleaned calciner exhaust gas was discharged from scrub tower 3 of washing stage C through line 25. This waste gas contained only a residual quantity of sulphur dioxide of 300 mg/m$^3$ (gas of standard condition after deduction of the moisture content). This gas could be released into the atmosphere.

Part of the wash liquid contained in storage vessel 4 of washing stage A, viz. 212 kg/h, was continuously withdrawn through line 26 for use as sulphuric acid-containing process solution. As this solution had a sulphuric acid concentration of 9.9 wt %, it could be used directly for digestion and/or, if desired, for the dissolution of the digestion cake formed in digestion. The degree of sulphuric dioxide removal was 92.5%, and 17.0 kg/h sulphuric acid were obtained in the oxidation of sulphur dioxide, which acid could profitably be returned to the sulphate process, resulting in a saving of fresh acid.

EXAMPLE 2

A plant consisting of three washing stages A, B and C as shown in the flow chart of the FIGURE is used. Each of the three scrub towers 1, 2 and 3 consisted of glass-reinforced polyester and having the same dimensions as the scrub towers used in example 1. Below the fluid distributors 15, 16 and 17 each scrub tower was filled to a height of 7.5 m with packings of the type 'Telleretten 2'" (Registered Trade Mark, Ceilcote Korrosionstechnik GmbH Biebesheim/Rhine) consisting of polyethylene. Calciner exhaust gas freed from titanium dioxide dust, sulphuric acid and sulphur trioxide in a pretreatment stage and having a sulphur dioxide content of 3500 mg/m$^3$ (gas of standard condition after deduction of the moisture content) and an oxygen content of 14 vol. % (related to dry gas after deduction of the moisture content) and having a temperature of 64 degrees C. was passed into this plant at a rate of 1800 m$^3$/h (gas of standard condition after deduction of the moisture content). The packing of each scrub tower was dosed with 12 m$^3$/h wash liquid of a temperature of 64 degrees C. The wash filtrate used for scrubbing the calciner exhaust gas was derived by separating the titanium dioxide hydrate from the mother liquor; said wash filtrate contained 0.5 wt % sulphuric acid and 0.3 wt % iron, 20% of which were present as trivalent iron. The wash filtrate was used at a rate of 103.0 kg/h.

In the storage vessels 4, 5 and 6 the wash liquid was treated with air in an amount of 10 m$^3$/h (gas of standard condition) for each storage vessel.

The wash filtrate was fed through line 24 into storage vessel 6 of washing stage C. From this vessel the wash filtrate was first recycled via line 14, fluid distributor 17, the packing being in scrub tower 3 and line 9 until the wash liquid in washing stage C had reached a sulphuric acid concentration of 1.7 wt %. After this start-up phase, corresponding start-up phases followed in the two other washing stages until a steady state was reached there, too. A sulphuric acid concentration of 4.7 wt % was thus adjusted in scrub tower 2 and storage vessel 5 of washing stage B, and a concentration of 8.7 wt % H$_2$SO$_4$ was adjusted in scrub tower 1 and storage vessel 4 of washing stage A. The iron content in storage vessel 6 of washing stage C amounted to 0.28 wt %. 99% of this iron was present in trivalent form. The cleaned calciner exhaust gas was discharged from scrub tower 3 of washing stage C through line 25. This waste gas contained only a residual quantity of sulphur dioxide of 210 mg/m$^3$ (gas of standard condition after deduction of the moisture content). This gas could be released into the atmosphere.

Part of the wash liquid contained in storage vessel 4 of washing stage A, viz. 110 kg/h, was continuously withdrawn through line 26 for use as sulphuric acid-containing process solution. As this solution had a sulphuric acid concentration of 8.7 wt %, it could be used directly for digestion and/or, if desired, for the dissolution of the digestion cake formed in digestion. The degree of sulphuric dioxide removal was 94%, and 9.0 kg/h sulphuric acid were obtained in the oxidation of sulphur dioxide, which acid could profitably be returned to the sulphate process, resulting in a saving of fresh acid.

In the above examples, 25 kg (Example 1) resp. 25.5 kg (Example 2) sulphur dioxide per metric ton of TiO$_2$ produced were extracted from the calciner exhaust gas which otherwise would have escaped into the atmosphere. Considering the large volume of titanium dioxide industrially produced by the sulphate process, the process of the instant invention therefore considerably relieves the environment. Additionally, the present invention keeps considerable quantities of wash filtrate away from the sewer and provides a profitable use for it, which filtrate would otherwise also have burdened the environment.

Numerous variations on the above described examples may be made by those skilled in the art all of which are encompassed by the appended claims.

I claim:

1. In a process for the production of titanium dioxide by precipitating titanium dioxide hydrate by thermal hydrolysis from a titanyl sulphate solution that is obtained after the digestion of titaniferous and ferriferous materials in sulphuric acid, separating the precipitated titanium dioxide hydrate from the hydrolysis mother liquor through filtration, washing the separated titanium dioxide hydrate, thereby generating a wash filtrate, and calcining the washed titanium dioxide hydrate, the improvement which comprises:
   a) treating a waste gas produced in the titanium dioxide production process which contains sulphur dioxide and at least 8 vol. % by dry gas measure of oxygen with said wash filtrate containing low wt % amounts of sulphuric acid and iron sulphates, said wash filtrate forming a wash liquid, the major part of the sulphur dioxide contained in the waste gas being absorbed by the wash liquid and transformed into sulphuric acid whereby the sulphuric acid concentration of the wash liquid is raised and a sulphuric acid-containing process solution is obtained;
   b) utilizing said sulphuric acid-containing process solution in said titanium dioxide production process; and
   c) said waste gas treatment with wash liquid taking place in a series of at least two consecutive countercurrent washing stages in such a way as to
      c1) introduce the untreated waste gas into the first washing stage and the fresh wash filtrate derived from said titanium dioxide hydrate washing, into the last washing stage,
      c2) pass the waste gas successively through the first to the last washing stages thus forming a wash liquid and treat it in these washing stages with the wash liquid formed from the wash filtrate whereby the sulphuric acid concentration of the wash liquid stepwise decreases from the first through to the last washing stage, the treatment being carried through in such a way that in each washing stage the wash liquid is introduced into the waste gas in a finely divided state in a scrub tower; and
      c3) withdrawing the cleaned waste gas from the last washing stage and said sulphuric acid-containing process solution obtained from the wash filtrate, from the first washing stage.

2. The process according to claim 1 wherein wash liquid is introduced into each washing stage from the immediately following washing stage, except for the last washing stage.

3. The process according to claims 1 or 2 wherein a wash filtrate is used which contains from 0.2 to 4 wt % $H_2SO_4$ and from 0.2 to 1 wt % iron in the form of iron sulphates, and wherein the sulphuric acid concentration of the wash filtrate is raised to from 8 to 13 wt % in the course of said waste gas treatment.

4. The process according to claim 3 wherein a ratio of trivalent iron to total iron of more than 0.05 is maintained in said wash liquid in the course of said waste gas treatment and wherein a ratio of sulphuric acid concentration to total iron concentration of at least 1 is adjusted in said wash filtrate prior to contacting it with said waste gas, this latter ratio in said wash liquid formed from said wash filtrate being raised to above 20 in the course of said waste gas treatment.

5. The process according to claims 1 or 2 wherein said waste gas treatment is carried through in three washing stages.

6. The process according to claims 1 or 2 wherein a specified range of sulphuric acid concentration is maintained in said wash liquid of each washing stage.

7. The process according to claim 6 wherein said sulphuric acid concentration of said wash liquid is adjusted by recycling at least part of said wash liquid within a washing stage between the scrub tower and a storage vessel of said washing stage.

8. The process according to claims 1 or 2 wherein fresh wash filtrate is introduced not only into the last washing stage but also into one or more of the other washing stages.

9. The process according to claims 1 or 2 wherein wash liquid is introduced into one or more of the washing stages from one or more of those washing stages which do not immediately follow the washing stage into which the wash liquid is introduced.

10. The process according to claims 1 or 2 wherein wash liquid is introduced into one or more of the washing stages from one or more of those washing stages which precede the washing stage into which the wash liquid is introduced.

11. The process according to claim 5 wherein the waste gas treatment in three washing stages is carried out in such a way that a sulphuric acid concentration of from 8 to 12 wt % is maintained in the wash liquid of the first washing stage, a sulphuric acid concentration of from 3 to 7 wt % is maintained in the wash liquid of the second washing stage and a sulphuric acid concentration of from 0.2 to 4 wt % is maintained in the wash liquid of the third washing stage.

12. The process according to claims 1 or 2 wherein the sulphuric acid-containing process solution is returned to the digestion tank.

13. The process according to claims 1 or 2 wherein a solid digestion cake is formed in the digestion of titaniferous and ferriferous materials which cake is dissolved forming titanyl sulphate solution, the sulphuric acid-containing process solution being used for dissolving the digestion cake.

14. The process according to claims 1 or 2 wherein the waste gas treated is derived from a titanium dioxide production process.

15. The process according to claim 14 wherein the waste gas treated is the calciner exhaust gas generated in the calcination of the washed titanium dioxide hydrate.

16. The process according to claims 1 or 2 wherein a packing is installed in one or more of said scrub towers, all the wash liquid is fed into the packing and distributed in the packing, and the waste gas is fed into the packing from below and comes into contact with the finely divided wash liquid within this packing.

17. The process according to claims 1 or 2 wherein air is introduced into the wash liquid in storage vessels arranged to receive wash liquid from the scrub towers.

18. In a process for the production of titanium dioxide by precipitating titanium dioxide hydrate by thermal hydrolysis from a titanyl sulphate solution that is obtained after the digestion of titaniferous and ferriferous materials in sulphuric acid, separating the precipitated titanium dioxide hydrate from the hydrolysis mother liquor through filtration, washing the separated titanium dioxide hydrate, thereby generating a wash filtrate, and calcining the washed titanium dioxide hydrate, the improvement which comprises:
　a) treating a waste gas produced in the titanium dioxide production process which contains sulphur dioxide and at least 8 vol. % by dry gas measure of oxygen with said wash filtrate containing low wt % amounts of sulphuric acid and iron sulphates, said wash filtrate forming a wash liquid, the major part of the sulphur dioxide contained in the waste gas being absorbed by the wash liquid and transformed into sulphuric acid whereby the sulphuric acid concentration of the wash liquid is raised and a sulphuric acid-containing solution is obtained;
　b) said waste gas treatment with wash liquid taking place in a series of at least two consecutive countercurrent washing stages in such a way as to
　　b1) introduce the untreated waste gas into the first washing stage and the fresh wash filtrate derived from said titanium dioxide hydrate washing, into the last washing stage,
　　b2) pass the waste gas successively through the first to the last washing stages thus forming a wash liquid and treat it in these washing stages with the wash liquid formed from the wash filtrate whereby the sulphuric acid concentration of the wash liquid stepwise decreases from the first through to the last washing stage, the treatment being carried through in such a way that in each washing stage the wash liquid is introduced into the waste gas in a finely divided state in a scrub tower; and
　　b3) withdrawing the cleaned waste gas from the last washing stage and said sulphuric acid-containing solution obtained from the wash filtrate, from the first washing stage.

* * * * *